(12) United States Patent
Grispin

(10) Patent No.: US 7,344,622 B2
(45) Date of Patent: Mar. 18, 2008

(54) PYROLYTIC PROCESS AND APPARATUS FOR PRODUCING ENHANCED AMOUNTS OF AROMATIC COMPOUNDS

(76) Inventor: Charles W. Grispin, 50 S. Pershing, Akron, OH (US) 44313

( * ) Notice: Subject to any disclaimer, the term of this patent is extended or adjusted under 35 U.S.C. 154(b) by 390 days.

(21) Appl. No.: 10/409,983

(22) Filed: Apr. 8, 2003

(65) Prior Publication Data

US 2004/0204620 A1 Oct. 14, 2004

(51) Int. Cl.
*C10B 7/14* (2006.01)

(52) U.S. Cl. .................. 202/97; 202/105; 202/110; 202/113; 202/150; 202/266; 110/245

(58) Field of Classification Search ............... 201/25; 202/97, 105, 110, 113, 150, 266; 110/245
See application file for complete search history.

(56) References Cited

U.S. PATENT DOCUMENTS

| | | | |
|---|---|---|---|
| 2,470,361 A | 5/1949 | Miller et al. | |
| 3,085,038 A | 4/1963 | Rovesti | |
| 3,714,038 A | 1/1973 | Marsh | |
| 3,809,680 A | 5/1974 | Wakefield | |
| 3,822,218 A | 7/1974 | Whittaker et al. | |
| 3,823,223 A | 7/1974 | Liska et al. | |
| 3,864,096 A | 2/1975 | Urban | |
| 3,864,097 A | 2/1975 | Urban | |
| 3,910,775 A | 10/1975 | Jackman | |
| 3,923,472 A | 12/1975 | Martinez et al. | |
| 3,926,582 A | 12/1975 | Powell, Jr. et al. | |
| 3,933,577 A | 1/1976 | Penque | |
| 3,947,256 A | 3/1976 | Tsukagoshi et al. | |
| 3,961,913 A | 6/1976 | Brenneman et al. | |
| 3,996,022 A | 12/1976 | Larsen | |
| 4,028,068 A | 6/1977 | Kiener | |
| 4,063,903 A | 12/1977 | Beningson et al. | |
| 4,095,956 A | 6/1978 | Holmes | |
| 4,123,332 A | 10/1978 | Espenscheid et al. | |
| 4,145,188 A | 3/1979 | Espenscheid et al. | |
| 4,164,396 A | 8/1979 | Jones | |
| 4,325,329 A | 4/1982 | Taylor | |
| 4,344,770 A | 8/1982 | Capener et al. | |
| 4,648,328 A * | 3/1987 | Keough .................. 110/229 |
| 4,746,406 A | 5/1988 | Timmann | |

(Continued)

FOREIGN PATENT DOCUMENTS

CH    A237758    9/1945

(Continued)

OTHER PUBLICATIONS

Paul T. Williams, David T. Taylor, "Aromatization of tyre pyrolysis oil to yield polycyclic aromatic hydrocarbons", published Oct. 15, 1992, pp. 1469-1474.

(Continued)

*Primary Examiner*—N. Bhat

(57) ABSTRACT

A pyrolysis process and reactor converts various hydrocarbons such as waste materials, for example, scrap polymers, tires, etc., into various chemical components or amounts thereof, not otherwise produced by conventional pyrolytic processes. A large reactor size is utilized in association with a low heat input per unit weight of charge. A thick pyrolyzate/"char" layer is formed during pyrolysis. The product or various components thereof can be utilized as a fuel or octane additive.

22 Claims, 1 Drawing Sheet

U.S. PATENT DOCUMENTS

| | | | | |
|---|---|---|---|---|
| 4,823,712 | A | * | 4/1989 | Wormer ................... 110/245 |
| 4,872,954 | A | * | 10/1989 | Hogan ...................... 202/105 |
| 5,082,534 | A | | 1/1992 | Breu |
| 5,230,777 | A | * | 7/1993 | Jarrell ........................ 202/97 |
| 5,258,101 | A | | 11/1993 | Breu |
| 5,342,421 | A | | 8/1994 | Breu |
| 5,820,736 | A | | 10/1998 | Bouziane et al. |

FOREIGN PATENT DOCUMENTS

| | | |
|---|---|---|
| DE | 29 25 202 | 1/1981 |
| EP | 0162802 * | 11/1985 |
| EP | 0162802 A2 | 11/1985 |
| EP | 0162802 A3 | 11/1985 |
| FR | 885665 | 9/1943 |
| FR | 971 510 | 1/1951 |
| FR | 971510 | 1/1951 |
| GB | 1481352 | 7/1977 |
| GB | 1481353 | 7/1977 |
| GB | 2032409 | 5/1990 |
| JP | 56159147 | 5/1980 |

OTHER PUBLICATIONS

R.S. Lehrle, et al., "Diagnosing mechanisms of oligomer formation in the thermal degradation of polymers", published Dec. 20, 1995, pp. 183-196.

D.M. Bate, et al., "A critical comparison of procedures for evaluating rate constans in thermal degradation, illustrated by pyrolysis-g.c. results form four polymers", published Oct. 10, 1977, pp. 73-83.

D.E. Wolfson, et al., "Destructive Distillation of Scrap Tires", pp. 1-19.

* cited by examiner

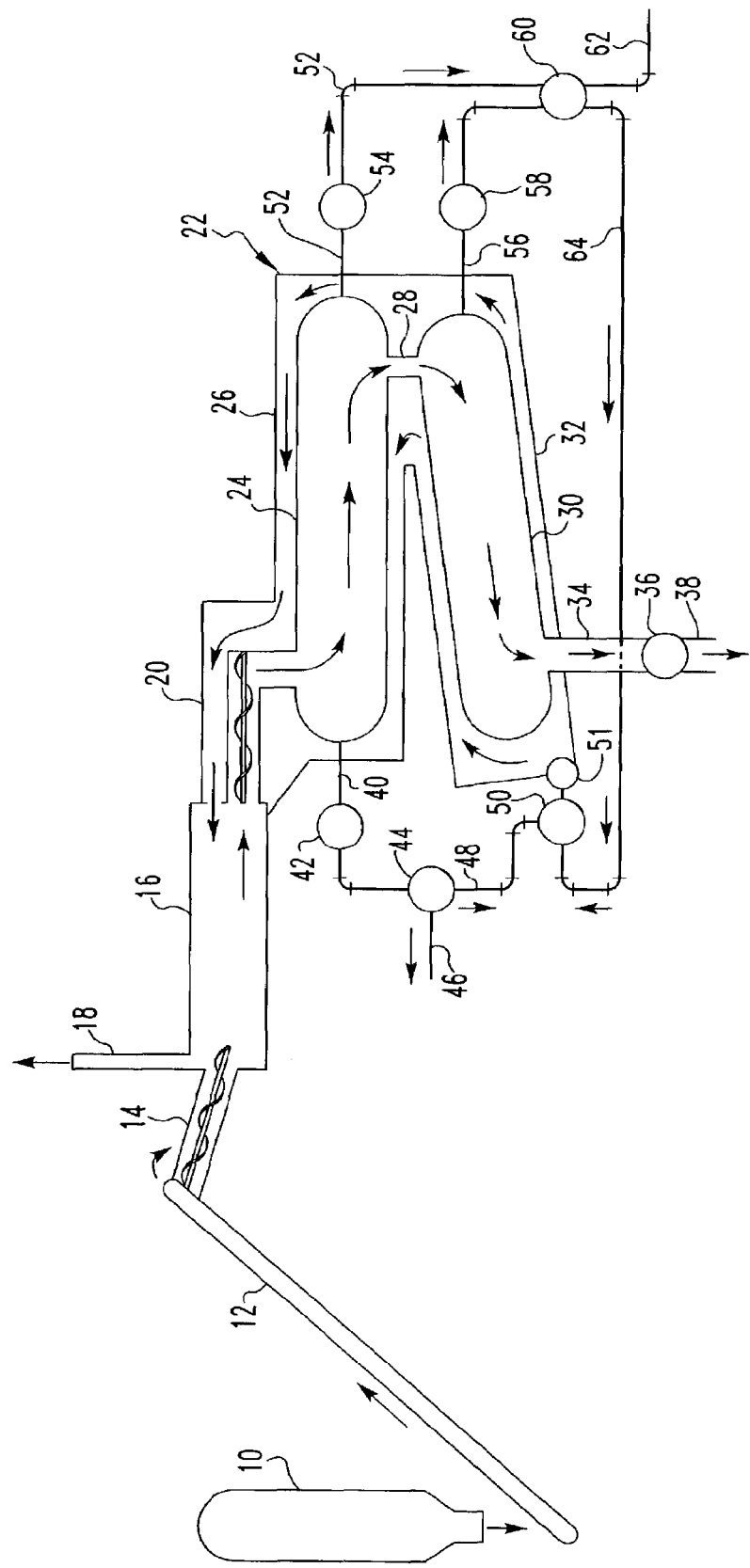

PYROLYTIC PROCESS AND APPARATUS FOR PRODUCING ENHANCED AMOUNTS OF AROMATIC COMPOUNDS

BACKGROUND OF THE INVENTION

1. Technical Field

The present invention relates to a pyrolytic process. More specifically, the present invention relates to a process for producing novel components or components in clearly unexpected amounts as compared to conventional processes heretofore utilized.

2. Background Information

Heretofore, pyrolytic reactors have generally utilized small amounts of materials at very high heat input rates. The material was typically thinly spread over the heating surface.

Moreover, applicant is not aware of any prior art patents which teach or suggest applicant's process as well as the results obtained therefrom. For example, U.S. Pat. No. 3,714,038 to Marsh relates to a pyrolysis process wherein a mixture of organic and inorganic wastes are pulped in a liquid such as water to form a slurry, dewatered, and then pyrolyzed or hydrogenated. As such, it lacks any suggestion of applicant's reactor size, slow heat input, a deep char bed, and the like.

U.S. Pat. No. 3,822,218 to Whittaker relates to the addition of a carbonaceous binder to a rubber prior to the destructive distillation thereof.

U.S. Pat. No. 3,823,223 to Liska relates to a destructive distillation of synthetic rubber scrap to produce a char which, when ground, can be used in reinforcement of rubbers.

U.S. Pat. No. 4,123,332 to Rotter also relates to a process and apparatus for treating carbonizable materials such as tires. Various end products are produced.

U.S. Pat. No. 3,085,038 relates to a process for recovering cellulose from vegetable materials via hydrolysis.

U.S. Pat. Nos. 3,864,097 and 3,864,096 relate to a process for converting cellulose into an oil with a catalyst and at temperatures of between 200° C. to 375° C.

U.S. Pat. No. 3,910,775 to Jackman discloses an apparatus and method for converting refuse, sewage, and industrial wastes into fuel substances. The waste material is converted to briquettes which can be burned as a fuel.

U.S. Pat. No. 3,923,472, to Martinez relates to a process for converting thermoplastic synthetic fibers into an oil suitable for use as a fuel. The fibers are first saturated in an oil-bearing liquid and then heated to a temperature which changes the mixture into a liquid state.

U.S. Pat. No. 3,926,582 to Powell relates to the pyrolytic treatment of solid waste materials including a heterogeneous mixture of organic and inorganic wastes of all known types. The process, however, is conducted in an oxygen-rich gas.

U.S. Pat. No. 3,933,577 to Penque employs the step of sonically pulping municipal waste in the presence of water and certain alkaline compounds.

U.S. Pat. No. 3,947,256, to Tsukagoshi relates to applying simultaneous compression and shearing action on polymers until they are in a fluid state. The fluid can be equalized as a fuel.

U.S. Pat. No. 3,961,913, to Brenneman discloses a process for treating organic waste materials with acids at elevated temperatures to form a solid fuel material.

U.S. Pat. No. 3,996,022 to Larsen relates to a process for converting waste solid rubber scrap into useful liquid, solid and gaseous products. The process is conducted in the process of certain salts at temperatures of between 300° C. and 500° C.

U.S. Pat. Nos. 4,063,903, to Beningson relates to an apparatus for disposal of solid wastes by converting them to a fuel and some amount of sterile land fill materials. Various steps are applied such as shredding, magnetic separating, separating finds, applying acids, heating and drying.

U.S. Pat. No. 4,095,956 to Holmes relates to a system for processing municipal wastes, wherein the waste is separated into a combustible fraction which is bailed and can subsequently be burned.

U.S. Pat. No. 4,145,188, to Espenscheid solubilizes municipal refuse and other solid organic wastes in a highly aromatic refined petroleum solvent to produce a homogeneous heavy oil or bitumen composition.

U.S. Pat. No. 4,164,396 to Jones relates to producing a fuel from waste refuse material by combining solid fibrous materials with liquid combustible materials.

U.S. Pat. No. 4,325,329, to Taylor relates to producing alcohol and mixing it with gasoline on board a vehicle.

U.S. Pat. No. 4,028,068 to Kiener relates to a process and apparatus for the production of combustible gas.

A brochure by Kutries relates to a pyrolytic process but lacks a suggestion of the production of aromatics from non aromatics and the necessity of stability.

U.S. Pat. No. 4,344,770 to Capener relates to a method and apparatus for converting solid organic materials such as garbage, sewage, sludge and cellulosic products into a fuel oil and gas. Pyrolysis of the waste material is reported to produce certain oil fractions which can be used as fuels as in the firing of a boiler.

U.K. Patent No. 1,481,352 discloses a method of thermal decomposition of hydrocarbons by, at least partially, indirect contact of hydrocarbons with a hot gas. The gas is let off after heat exchange separately from the gaseous products formed during decomposition. Tires are heated in a tube by hot gases flowing through a jacket around the tube. In another embodiment the tube has a grid region into which a combustion gas is fed to aid carbonization by direct gas heating/combustion at the grid carbon interface. Steam or $CO_2$ may be fed to the grid to form water gas or reduce gas to aid combustion. As such, there is no substantial absence of oxygen.

U.S. Bureau of Mines report of investigation #7302 discloses a method of destructive distillation of scrap tires. A report was made of tests conducted under a variety of conditions. Solids, liquids, and gases were produced, recovered and analyzed. The quantities of various products were shown to be dependent on test temperature. Variability in the composition of the liquid and gaseous products changed in accordance with temperature, and were also reported.

U.S. Pat. No. 4,746,406 to Timmann discloses a process for the pyrolytic reprocessing of plastic, rubber, or other hydrocarbon materials in which the resultant pyrolysis gas is brought into a cooling stage and reduced to a temperature just above the freezing point of water and to a pressure of approximately 0.8 to 1.4 bar of overpressure. The resultant condensate is then separated and heated to a normal storage temperature and the super atmospheric pressure on the condensate reduced to atmospheric pressure. The gas released therefrom comprises a C1 to C4 mixture of hydrocarbon compounds and is supplied to the pyrolysis process as a special process gas. A substantial increase in the proportion of aromatic compounds in the pyrolysis gas is reported.

U.S. Pat. No. 5,082,534 to Breu discloses a rotary, continuous pyrolytic conversion system which converts solid hydrocarbon containing feedstock into gases, liquid hydrocarbons and char. A converter drum is contained within an outer drum which is in a substantially air-tight relationship with an injector for introducing the feedstock in the form of bales and with a discharge chute for the solid products of pyrolysis. A casing around the outer stationary drum defines an over chamber which is heated by combustion products. A rod extends into the injection end of the converter drum for support of scraper(s) which run near or bear against the inner periphery of the converter drum. A crusher bar is carried in the drum at the discharge end thereof and crushes the solid products. A second pyrolysis reactor may receive the solid pyrolysis products and be operative at higher temperature than the first converter to destroy chlorinated hydrocarbons.

U.S. Pat. No. 5,230,777 to Jarrell discloses a method and apparatus for producing fuel and carbon black from rubber. The method and apparatus produce a liquid fuel that is low in sulfur content, gaseous hydrocarbons, and solid carbonaceous materials from used rubber tires. Rubber is heated under negative pressures in the presence of a minimal amount of oxygen. The methods and apparatus of the present invention are said to produce little air emissions and conserve energy.

U.S. Pat. No. 5,258,101 to Breu discloses a pyrolytic converter utilizing a rotatable drum surrounded by an outer drum support structure and disposed in an over chamber which pyrolyzes materials including plastic waste, tires, materials from automobile shredding operations, containers and trays of plastic material, rubber, leather, garbage, sewage sludge, coal, oil shale, broken asphalt and the like. These materials are formed into cartridges by a compactor using a reciprocating ram which forms cartridges that enter an injection tube wherein another ram injects the cartridges into the converter drum. The converter is disposed on a fulcrum near the injection end thereof while the discharge end is suspended by cables to accommodate thermal expansion of the converter. Cables also suspend collection and separation apparatus having water filled chutes, into one of which the products of pyrolyzation of low density (char) and solids of higher density are discharged from the converter drum. Lower and higher density solids are separately collected tanks.

U.S. Pat. No. 5,820,736 to Bouziane, et al discloses an apparatus that can effect pyrolysis of hydrocarbon containing material at high temperatures of 400° to 500° C. and under vacuum in consecutive batches. The apparatus comprises a cylindrical drum rotatable at a variable speed about a horizontal axis and spacedly surrounded by a heat insulating sheath; a gas burner heats the rotating drum along its entire length from the exterior of the same; a chimney communicates with the space between the drum and the sheath, which has ventilation openings closeable by trap doors; the drum is supported by bearings so as to allow its axial thermal expansion. A manifold system of filters is stationarily mounted withing the rotating drum to filter out fine solid residues from the pyrolytic gases and vapors. This manifold is connected to a discharge tube which exits from one end of the drum and is fitted with a sealing joint to seal the drum around the stationary discharge tube. This joint has a passage for admitting into the drum emergency inert gas to prevent atmospheric air from entering into the drum in the event of an accidental leak of the rotary joint. The drum has an access door and a system to swing the door open and to properly seal the door in position on the drum.

However, none of these patents or other references suggest applicantis process of utilizing a large volume reactor, a fairly sufficient amount of hydrocarbonacetous material such as various polymers, the formation of a temperature gradient across a pyrolyzate/char layer with a slow heating rate which creates a specific temperature gradient and the substantial absence of oxygen. Furthermore, the moderate conditions used contradicts the products which suggest that severe conditions have been utilized. Furthermore, these references fail to teach or suggest and, in fact, teach away from the end products obtained by applicantis process, especially the high percentage of aromatics and, particularly, the gross formation of new aromatic rings.

SUMMARY OF THE INVENTION

It is therefore an aspect of the present invention to provide a process for pyrolyzing hydrocarbonacetous materials.

It is also an aspect of the present invention to provide a process for pyrolyzing hydrocarbonacetous materials, as above, wherein said materials are polymers with a slow heating rate which creates a specific temperature gradient and the substantial absence of oxygen. Furthermore, the moderate conditions used contradict the products obtained, which suggest that severe conditions have been utilized.

It is yet another aspect of the present invention to provide a process for pyrolyzing hydrocarbonacetous materials, as above, wherein said pyrolytic process utilizes a relatively low heating rate.

It is yet another aspect of the present invention to provide a process for pyrolyzing hydrocarbonacetous materials, as above wherein a sufficient amount of material is utilized such that a pyrolyzate/char bed is formed having a temperature gradient thereacross.

It is yet another aspect of the present invention to provide a process for pyrolyzing hydrocarbonacetous materials, as above, wherein decidedly different products are produced from a feed stock than from the utilization of conventional pyrolytic methods, wherein the process is sensitive to size, that is the nature of the bed is related to the product. Reactor size, charge amount/volume, heating rate, and substantial exclusion of oxygen, all simultaneously, yield a novel process result.

These and other aspects of the present invention will become apparent from the subsequent description.

These and other aspects are provided by the present invention which is a pyrolysis process for hydrocarbonacetous material, comprising the steps of obtaining a pyrolytic reactor having an internal volume of at least 1 cubic foot; charging an amount of hydrocarbon material thereto such that a pyrolyzate/charge layer is formed during heating; applying heat at a rate of from about 1,000 btu's per pound of charge per hour or less to said hydrocarbon material; and drawing off and collecting by-products from said reactor.

BRIEF DESCRIPTION OF THE DRAWINGS

The present invention is further described with reference to the accompanying drawings in which:

DETAILED DESCRIPTION OF PREFERRED EMBODIMENTS

Specific characteristics of this invention include large reactor sizes, large amounts of charged hydrocarbonacetous materials, low heat input rates, a formation of a pyrolyzate/ char material on the reactor heating surface having a temperature gradient across said pyrolyzate/char material, substantial absence of oxygen, and the like. The reactors hydrocarbonacetous feed stock can be that utilized by conventional pyrolytic processes but desirably are polymers such as polyethylene, polypropylene, polyester, acrylonitrile-butadiene-styrene (ABS) copolymers, polyamide, polyurethane, polyethers, polymer alloys, block copolymers, and the like. Generally, polymers in the form of scrap material, for example scrap polystyrene, ABS, tires, polyethylene, polypropylene, scrap paint, scrap adhesive, automotive waste (fluff), scrap resin, and the like, are ideally suited for use as a charge material in association with the present invention. The preferred charge material is a random well mixed polymer scrap. That is, the charge material should be a combination of i.e., polybutadiene, styrene-butadiene copolymer, polyisoprene, etc. Polymers yielding halogenated material upon pyrolysis can be tolerated ,but due to their corrosive effect, are not desired. Such polymers include polyvinyl chloride, polytetrafluoroethylene, and other halogenated polymers. Other hydrocarbons which can be utilized are believed to include coal, shale oil, and carbohydrates. Scrap material used as feed stock, such as scrapped tires and the like, should be in the form of pellets or small particles that have been shredded.

The heating temperature applied to the pyrolytic reactor is generally from 800° F. to about 2,500° F., desirably from about 1,200° F. to about 2,300° F. and preferably from about 1,500° F. to about 2,000° F. Due to the high heating temperature, reactor vessels are utilized which have a higher melting point. Typically, steel, stainless steel, or high temperature alloys, e.g. Inconel are utilized. The heat source can be any conventional source yielding a desired temperature and includes natural gas, electric heat, coke and the like. Moreover, the heating rate can be variable and/or include reheating. Furthermore, non-condensible products, i.e. C1 to C4 gases produced by the process can also be used as a product or a heat source.

The reactor vessel of the present invention is generally considered important, whereas most prior art vessels were of a small size, generally below 1 cubic foot. Furthermore, reactor vessels of the present invention generally have an inside volume of about 1 cubic foot to about 10,000 cubic feet, desirably from about 3 cubic feet to about 2,000 cubic feet, more desirably from about 8 to about 200 cubic feet. Preferably the reactor will be spherical, spheroid or pipe like. Although larger sizes can be utilized, they are generally impractical because of fabrication costs, engineering considerations and the like. The pyrolytic reaction can be conducted without mechanical agitation. Should some sort of an internal mixer be utilized, the internal volume is usually larger as from about 2 cubic feet to about 2,000 cubic feet and preferably from about 10 to 500 cubic feet. Naturally, the rate of agitation and agitator configuration are parameters that would influence optimal reactor design. Should a continuous type reactor be utilized, that is wherein the material is gradually conveyed along a bed or the like, much larger reactors may be utilized. However, in general, the conveyor bed can be broken up into a plurality of units, each treated as a separate entity as it moves along the bed, with each separate unit being within the volume reactor size as set forth above. Although the reactor shape can vary, generally reactors having a high volume to surface area are desired, such as cubical, rectangular, spherical, and tank-like type reactors. Moreover, the reactor should have a sufficient depth to enable the formation of a pyrolyzate/char layer during pyrolysis and sufficient head space thereabove to allow escape of products, e.g. (Gases) and provide for processing ease. That is, a large head space gives surge volume and prevents plugging of the system.

The amount of material utilized in the reactor is generally quite high. Based upon a standard comparison of approximately 64 cubic feet, that is a cubical vessel having edges of four feet, the weight is from about 100 to about 1,000 pounds of said hydrocarbon charge material, desirably from about 200 to about 750, with a preferred amount being from about 300 to about 500 pounds. Smaller or larger size reactors generally have a proportional amount of material. An agitated system has a higher range as from about 200 to about 3,500 pounds and preferably from about 500 to about 2,000 pounds. Generally the optimum size will vary according to the type of charge material and agitation.

As shown in FIG. 1, the upper inner walled vessel and the lower inner walled vessel are inclined in opposed directions.

The heating rate constitutes an important aspect of the present invention in that it has been found that use of relatively low input heat rates along with the formation of a pyrolyzate/char bed, large amounts of feed stock, and the like, yield products and/or amounts thereof not heretofore achieved. Typically, a heat input rate of 5,000 btu's or less per pound of material per hour is utilized. More desirably, a heat input of 2,000 btu's or less is utilized with an input of about 500 btu's per pound of feed stock per hour being preferred. However, the input is generally greater than 100 btu's per pound per hour.

The formation of a the pyrolzate/char layer or bed, is due to the high heat applied to a surface of a vessel, essentially breaking down the feed material and yielding various pyrolysis products. The pyrolyzate bed depth necessary to a particular pyrolysis reaction will vary according to various parameters such as heat rate, amount of material utilized, type of material utilized, pressure, agitation, and the like. However, a requirement of the present invention is that the heating rate and mass of material utilized is such that a pyrolyzate/char bed or layer is formed having a temperature gradient thereacross. That is, the formation of a pyrolyzate/char bed temperature gradient is a dynamic condition depending upon various parameters as noted above. Generally, the thickness of the char layer is a few inches, although it may be several.

The reaction is generally carried out at atmospheric pressure or at a low pressure, for example, from about 0.8 to about 80 psig, with from about 0 to about 15 psig preferred. The pressure is due to internal generation of gas/es.

As in accordance with general pyrolysis equipment, the present invention utilizes necessary and conventional support equipment. For example, a gas take-off stream that has a condenser, for example, thereon. Other appropriate equipment include various liquid streams, heat exchangers, instrumentation, catalytic reformers, stripping and distillation columns, and the like which may be part of integrated downstream process. Although not fully understood, it is thought that the following occurs in the reaction vessel.

Once the material, for example, waste or scrap polymer has been added to the large vessel, in large amount, heat at a specified rate is applied. Due to the high heating temperature, i.e. open flame, the material adjacent to the heated surface generally decomposes first and breaks down into various components, often in the form of gases and liquids. As pyrolysis of this fraction or layer continues, a char layer is formed. This char supports unusual reactions and maintains a temperature gradient, yet it impedes heat flow. Due to the high temperatures involved, a generally fluid mass is formed above the char layer which tends to be in somewhat constant churning motion via convection and/or conduction mass transfer (boiling), or the like. The pyrolyzate/char layer is generally formed of a sufficient thickness such that a temperature gradient thereacross exists. That is, a significant drop in temperature as from about 300° F. to about 1,500° F. may exist across the char layer from the surface contacting the heated surface to the upper boundary of the char layer.

During pyrolysis, the temperature of a reaction vessel may be of one degree whereas the bottom pyrolyzate/char layer is of a different temperature, which in turn is different from the top pyrolyzate/char layer, which in turn is different from the pyrolyzate liquid, which may in turn be different from the exiting gases or types of products therefrom. It has been observed that, for a given steady heating rate, the rate of pyrolysis is usually not constant. Different rates of pyrolysis and/or types of products from within the pyrolysis vessel can occur. Above the initial activation temperature for a given pyrolytic system, various plateaus of production rate and product temperature have been observed. From a thermodynamic standpoint, a temporary or pseudo-equilibrium is maintained during the plateau until products being expelled are exhausted and a new level must then be reached. This next temperature level will be naturally sought at which time different degradation reactions may occur evolving yet other pyrolytic components. The pyrolysis reactions thus continue until essentially all of the material has been pyrolyzed, leaving the exhaustively pyrolyzed char layer. Generally, dependent on the nature of the feed stock, the char layer in the reaction vessel is usually of a porous nature.

Should the reactor be of a continuous type, the formation of the char layer and evolution of various fractions tend to take place as a unit along a specific horizontal length as the bed moves from the feeding station to the end dumping station. Thus, the unit thereof can essentially be treated as a self-contained batch process.

Generally, the present invention tends to produce higher amounts of unsaturated organic compounds as well as higher amounts of aromatic compounds as compared to convention pyrolytic processes. Additionally, novel or unusual compounds are often obtained.

Depending upon the type of initial feed stock utilized, the end products can be used for common and conventional applications. However, a large portion of the end products can find considerable use as octane additives for gasoline. These same alkylated aromatics are also very desirable feedstocks for many commercial applications. The char from the process is suitable for use with various fuels such as boiler fuels, utilization with coal, and the like. Obviously, other applications exist.

BRIEF DESCRIPTION OF THE DRAWINGS

FIG. 1 is the double walled large volume two unit pyrolytic reactor.

Referring to FIG. 1, a preferred apparatus for carrying out the process for the present invention would include a feed hopper 10 which feeds polymer scrap to a incline conveyor 12 which at its upper end feeds the scrap into an auger feed 14 from where it is fed into a rotary dryer 16 having a flue gas exit pipe 18. An auger/air lock 20 feeds a multi stage double walled vessel shown generally at 22. The vessel 22 includes an upper inner walled vessel 24 and an upper outer walled vessel 26. There is upper vertical connecting tube 28 between the upper inner walled vessel 24 and a lower inner walled vessel 30. The lower inner walled vessel 30 is surrounded by a lower outer walled vessel 32 a lower discharge tube 34 extends from the lower inner walled vessel through the lower outer walled vessel to a horizontal discharge tube with air lock 36 which discharges char 38. A line 40 extends from the upper inner walled vessel 24 through the upper outer walled vessel to heat exchanger 42 and then to valve 44 to a liquid line 46 for product storage and a loop gas line 48 which extends to valve 50 on the lower outer walled vessel 32. Line 52 extends from the upper inner walled vessel 24 through the upper outer walled vessel 26 to heat exchanger 54. Line 56 extends from lower inner walled vessel 30 through lower outer walled vessel 32 to heat exchanger 58 lines 52 and 56 extend respectively from heat exchangers 54 and 58 to a valve 60 which diverts the stream to liquid line 62 which extends to product storage. Loop gas line 64 which extends back to valve 50 to inject gas into burner 51 which leads to the space between the lower outer walled vessel 32 and the lower inner walled vessel 30. This hot-burned flue gas continues to flow upwardly between the upper inner walled vessel 24 and the upper outer walled vessel 26 and then past the auger air lock 20 so as to heat the material flowing downwardly through the auger air lock 20. The hot flue gas then flows through 16 then out 18, preheating the incoming material.

The present invention will be better understood by reference to the following examples.

EXAMPLE 1

A 50/50 (by weight) blend of cis-polyisoprene (Goodyear Natysyn), containing 96% (by weight) plus of synthetic cis-1,4-polyisoprene, and beads of polystyrene commercial grade clear were added to the various reactors.

Reactor 1 was a 24 inch by a 2 inch diameter pipe SCH 40 of 304 stainless steel which was capped at the ends. The reactor was heated with a propane burner having a flame temperature of approximately 1,800° F. with a burner size of approximately 24 inches long and 2 inches in width. The reactor contained one pound of the blend and was heated at the rate of 41, 000 btu's per pound per hour. The heating time with regard to exhaustive pyrolysis was approximately 30 minutes.

Reactor 2 was a 36 inch by 4 inch diameter pipe containing two 150 pound flanges on the ends thereof covered by 150 pound blind flanges. The reactor contained 10 pounds of the blend and was heated with the same burner as reactor 1, resulting in a heated rate of 4,100 btu's per pound charge per hour. The sample/reactor was heated until exhaustive pyrolysis occurred at about 1 hour and 55 minutes.

Reactor 3 was the same as reactor 4 set forth herein below and was also heated with propane at a temperature of approximately 1,800° F. The size of the burner was about 400,000 btu's per hour. 100 pounds of the blend was added to the reactor resulting in a heated rate of 4,000 btu's per pound charge per hour. After a period of approximately 2 hours exhaustive pyrolysis had occurred.

Reactor 4 was a 400 gallon reactor having spherical heads with a 4 foot diameter and ⅜ inch thickness. The shell of the stainless steel reactor was ¼ inch by 4 foot in length by 4 foot in diameter. This reactor was heated with the same propane heat source of about 400,000 btu's per hour. 1,000 pounds of the blend was added to the reactor yielding a heated rate of 400 btu's per pound charge per hour. After approximately 6 hours and 10 minutes exhaustive pyrolysis was reached.

All reactors were purged three times to 15 psig with $CO_2$ prior to the pyrolysis of the above described examples.

Standard conventional equipment such as a heat exchanger (condenser), surge tank and pressure regulator for escaping gas, were attached to the reactors to extract and collect the products. The pressures during the reactions were low generally of the range of 0 to 5 psig.

Table I sets forth the products yielded by each of the different size reactors. Reactor 1 had a heating input of approximately 41,000 btu's per pound of charge per hour, whereas Reactors 2 and 3 had a heating input of approximately 4,100 btu's per pound charge per hour, whereas Reactor 4 had a heating input of approximately 400 btu's per pound charge per hour. Reactors 1, 2, 3 and 4 relate as controls to each other showing how pyrolysis and itis products varied as the parameters of size and heat rate were changed. The amount of aromatics produced shows a significant increase in applicantis process relative to that of the prior art. Reactor 3 is believed to show conditions at or near a peak production of aromatics. Most dramatic is the amount of ethylbenzene produced which increased from 3 percent to almost 18 percent. The amount of (1-methylethyl) benzene (aka isopropyl benzene) also shows a dramatic change varying from 0.3 to 4.9 percent. In one example, styrene is drastically reduced as from about 60 percent to 33 percent. Additionally, the amount of 1-methyl-4-(1-methylethenyl)-cyclohexene (limonene) varied from 21.5 percent to about 11 percent by weight. It was also unexpected that significant amounts of (1-methylethenyl)cyclopropane, 1-methyl-1,3-cyclopentadiene, 1,5-dimethylcyclopentene, 2-methyl-1,3-pentadiene, 1,2-dimethylcyclohexane, and, most unusually, 3,7,7-trimethyl-bicyclo-[4.1.0]-hept-2-ene were produced. Also present were 3-methyl-2,4-hexadiene, 2,3-dimethyl-1,4-hexadiene, 2,3,6-trimethyl-1,5-heptadiene and 3-methyl-1,3,5-hexatriene (a cumlene) all present in all samples; the apparent aromatic(s) precursor(s). All unusual compounds are not sited here for brevity sake. However, comparison to the accepted art shows a very large difference in kind and amount of species. As a whole, large reductions or increases occurred in various compounds as compared to previous pyrolytic methods. Additionally, the amount of aromatics drastically changed, in that Reactor 1 shows a yield of 63.4%* of aromatics based upon a 50% aromatic input. Yields in Reactor 3 were 72%* aromatic output. It is also notable that, having started at 50% by weight, the process was still able to increase the yield of aromatics up 72% by weight. (*See Table III-A)

TABLE I

Polystyrene/Polyisoprene Pyrolysis

| | Reactor | | | |
|---|---|---|---|---|
| | I | II | III | IV |
| | Percent of in Pyrozylate by Wt. | | | |
| 2-butene | 0.2 | 0.1 | 0.5 | 0.5 |
| 3-methyl-1-butene | 0.1 | 0.1 | 0.1 | 0.2 |
| 2-pentene | 0.1 | 0.2 | 0.4 | 0.5 |
| 2-methyl-1,3-butadiene | 4.4 | 3.2 | 4.2 | 4.4 |
| (1-methylethenyl)cyclopropane | 0.1 | 0.1 | 0.2 | 0.2 |
| 1-methyl-1,3-cyclopentadiene | 0.1 | 0.1 | 0.2 | 0.1 |
| 1,5-dimethylcyclopentene | 0.2 | 0.1 | 0.2 | 0.1 |
| 2-methyl-1,3-pentadiene | 0.2 | 0.2 | 0.5 | 0.4 |
| 3-methyl-1,3,5-hexatriene | 0.2 | 0.2 | 0.3 | 0.2 |
| 3-methyl-2,4-hexadiene | 0.5 | 0.5 | 0.4 | 0.6 |
| 2,4,4-trimethyl-2-pentene | 0.1 | 0.1 | 0.1 | 0.1 |
| Toluene | 4.1 | 5.1 | 5.6 | 7.6 |
| 1,2-dimethylcyclohexane | 0.2 | 0.2 | 0.1 | 0.2 |
| 2,3-dimethyl-1,4-hexadiene | 0.2 | 0.2 | 0.3 | 0.3 |
| $C_8H_{12}$ unsaturated aromatic | 0.1 | 0.1 | 0.1 | 0.1 |
| Ethyl benzene | 3.2 | 6.3 | 3.2 | 18.8 |
| $C_9H_{14}$ unsaturated aromatic | 0.5 | 0.1 | 0.2 | 0.1 |
| (1-methylethyl) benzene | 0.3 | 0.7 | 0.6 | 4.9 |
| $C_{10}H_{16}$ unsaturated aromatic | 0.2 | 0.2 | 0.1 | 0.1 |
| Styrene | 54.6 | 51.0 | 60.2 | 33.2 |
| 1,2-dimethyl benzene | 0.3 | 0.3 | 0.9 | 0.2 |
| $C_{10}H_{16}$ unsaturated aromatic | 0.3 | 0.3 | 0.2 | 0.2 |
| Propyl benzene | 0.4 | 0.6 | 0.7 | 0.4 |
| (1-methylethyl)benzene | 4.3 | 7.1 | 3.8 | 7.7 |
| 1-methyl-5(1-methylethenyl)-cyclohexene | 0.4 | 0.3 | 0.5 | 0.4 |
| 4-methyl-1-(1-methylethenyl)-cyclohexene | 0.5 | 0.2 | 0.1 | 0.1 |
| 1-methyl-4-(1-methylethenyl)-cyclohexene | 21.5 | 19.0 | 11.2 | 14.1 |
| 3,7,7-trimethoxylbicyclo[4.1.0]-hept-2-ene | 0.3 | 0.4 | 0.1 | 0.6 |
| 1-methyl-4-(1-methylethyl)-cyclohexene | 0.7 | 0.6 | 0.7 | 0.5 |
| 2,3,6-trimethyl-1,5-heptadiene | 0.3 | 0.3 | 0.4 | 0.5 |
| 1-ethyl-2-methylbenzene | 0.5 | 0.7 | 1.2 | 0.8 |
| 1-ethyl-3-methylbenzene | 0.1 | 0.1 | 0.4 | 0.1 |
| 2-ethyl-1,3-dimethylbenzene | 0.3 | 0.3 | 0.3 | 0.2 |
| 1-pentenylbenzene | 0.5 | 0.3 | 0.7 | 0.6 |
| 1,2,3-trimethylbenzene | 0.1 | 0.1 | 0.2 | 0.1 |
| | 99% | 99% | 99% | 99% |

TABLE III-A

Styrene-Isoprene Pyrolysis

| | Reactor Output | | | |
|---|---|---|---|---|
| | I | II | III | IV |
| Pyrozylate Liquid by direct wt. | 91% | 95.8% | 92.0% | 94.625% |
| Char by direct wt. | 1% | 1.1% | 1.7% | 3.700% |
| Gas by difference | 8% | 3.1% | 6.3% | 1.675% |
| Aromatics in Pyrozylate (Table I) | 69.7% | 73.1% | 78.3% | 74.8% |
| Lbs. Aromatics produced Result | .697 × .91 .63427 lbs | 7.31 × .958 7.00298 lbs | 78.3 × .92 72.036 lbs | 748 × .94625 707.795 lbs |
| Lbs. Aromatics created Result | .63427 − 0.5 0.13427 lbs | 7.00298 − 5.0 2.00298 lbs | 72.036 − 50.0 22.036 lbs | 707.795 − 500.0 207.795 lbs |
| % Aromatics Created by wt. | 13.4% | 20.0% | 22.04% | 20.78% |

It is thus apparent from Table I that several unexpected increases or decreases of various components are obtained as well as amounts of aromatic compounds, which are not suggested by the prior art.

For example, the amount of toluene can range from about 4.1 to about 7.6 percent by weight, the amount of ethyl benzene can range from about 3.2 to 18.8 percent, the amount of (1-methylethenyl) benzene, aka alpha-methylstyrene, can range from about 3.8 to 7.7 percent, the amount of styrene can range from about 33.2 to 60.2 percent, and the amount of 1-methyl-4-(1-methyl-ethenyl)-cyclohexene(limonene) will range from about 11.2 to about 21.5 percent.

EXAMPLE 2

Various amounts of scrap tire rubber as set forth in Table II were added to the various reactors,. The reactor size, heating temperatures, input rate of heat, and the like are the same as set forth above with regard to Example 1. Also, the pyrolysis was carried out in the same manner as set forth in Example 1 with the only difference being that instead of a blend of polystryene and cis-1,4-polyisoprene, scrap rubber tires were utilized to charge the reactors. The results are set forth in Table II.

TABLE II

Tire Pyrolysis

| | Reactor | | |
|---|---|---|---|
| | I | II | III |
| | Percent of Pyrozylate by Wt. | | |
| Ethyl Benzene | 5.9 | 10.0 | 10.0 |
| Benzonitrile | 1.4 | 2.8 | 2.0 |
| (1-methylethenyl) Benzene | 2.5 | 1.0 | 2.9 |
| Styrene | 10.1 | 5.1 | 6.3 |
| Xylenes | 1.6 | 2.0 | 4.3 |
| Propyl Benzene | 1.2 | 1.6 | 1.4 |
| Ethylmethyl Benzene | 2.0 | 3.7 | 4.2 |
| Trimethyl Benzene | 1.9 | 2.1 | 3.4 |
| 2-ethyl-1,3-Dimethyl Benzene | 0.9 | 1.5 | 1.3 |
| Benzene | 5.9 | 6.5 | 6.1 |
| Toluene | 11.1 | 14.3 | 13.5 |
| 4-Methyl-1-Pentene | 0.8 | 0.0 | 0.0 |
| 1-Butene | 1.9 | 0.3 | 0.3 |
| 3-Methyl-1-Butene | 0.8 | 0.0 | 0.0 |
| 2-Pentene | 1.1 | 0.6 | 0.7 |
| Cyclopentene | 0.4 | 0.4 | 0.5 |
| 3-Methyl-1,3-Butadiene | 3.8 | 1.8 | 1.6 |
| 3,3 Dimethyl Cyclobutene | 0.9 | 0.9 | 1.0 |
| 1,3-Butadiene | 0.4 | 0.0 | 0.0 |
| Cyclohexene | 1.1 | 0.0 | 0.0 |
| 4-Methyl Cyclopentene | 1.3 | 1.2 | 1.6 |
| 3-Methyl-2,4-Hexadiene | 0.6 | 1.2 | 1.1 |
| 1,3,5-Hexatriene | 0.0 | 0.3 | 0.4 |
| 1,4-Cyclohexadiene | 0.4 | 0.0 | 0.0 |
| 1,2-Dimethylcyclohexane | 0.5 | 0.5 | 0.5 |
| 3,3-Dimethyl-1-Butene | 1.1 | 0.0 | 1.2 |
| 2,4-Hexadiene-1-ol | 0.7 | 0.8 | 0.8 |
| 5-Methyl-1,4-Hexadiene | 1.2 | 1.3 | 1.1 |
| 3-Pentene-2-one | 1.1 | 0.0 | 0.0 |
| 3,4,4-Trimethyl-2-Pentene | 0.0 | 1.0 | 1.2 |
| Formic Acid Heptylester | 1.4 | 0.0 | 0.0 |
| Heptane | 0.6 | 0.9 | 0.8 |
| 2-Methyl-1,4-Hexadiene | 1.5 | 0.0 | 0.0 |
| 2-Chloro-2-Methyl Propane | 1.1 | 1.0 | 1.2 |
| 4-Ethenylcyclohexene | 3.0 | 2.6 | 2.6 |
| Ethenylcyclohexene | 0.6 | 0.6 | 0.5 |
| 1-Chlorohexane | 0.5 | 0.0 | 0.0 |
| 2-Octene | 0.0 | 0.0 | 0.4 |
| 1-Octene | 0.5 | 0.0 | 0.0 |
| 1-Methyl-4-(1-Methylethenyl) Cyclohexene | 15.9 | 15.0 | 7.7 |
| 1-Butyl-2-Ethylcyclopropane | 0.6 | 0.9 | 0.5 |

TABLE II-continued

Tire Pyrolysis

| | Reactor | | |
|---|---|---|---|
| | I | II | III |
| | Percent of Pyrozylate by Wt. | | |
| 1,7,7-Trimethylbicyclo[2.2.1]-Hept-2-ene | 3.3 | 4.2 | 0 |
| 2,3,6-Trimethyl-1,5-Heptadiene | 1.2 | 1.7 | 1.3 |
| 1,2,3-Trimethylcyclopropane | 0.7 | 0.0 | 0.0 |
| 3-Chloro-1-Propynl-Cyclohexane | 0.4 | 0.0 | 0.0 |
| 2,2,4-Trimethyl-3-Pentene-1-ol | 0.9 | 1.1 | 0.0 |
| 2-Dimethylcyclohexene | 1.1 | 1.4 | 1.3 |
| 2,4,4-Trimethyl-1-Pentene | 0.6 | 0.5 | 0.3 |

As readily indicated by Table II, the pyrolysis of scrap rubbers yielded a significant amount of aromatic compounds. Inasmuch as scrapped tires constitute a major waste product of the United States, the present invention has great potential in reducing the stock piling of such tires and turning them into a useful resource. Excessive amounts of aromatics as compared to the prior art were produced. U.S. Bureau of Mines investigation #7302 reports tire pyrolysis yields averaging 33.9 gallons of aromatics per ton equivalent to 12.2 percent aromatics by weight. Reactors 1, 2 and 3 had aromatic yields of 19.78 percent, 20.27 percent and 23.24 percent respectively. Approximately double previously reported values.

TABLE III-B

Tire Pyrolysis

| Reactor Output | I | II | III | IV |
|---|---|---|---|---|
| Pyrozylate Liquid by direct wt. | 46% | 38.6% | 41.5% | NA |
| Char by direct wt. | 38% | 50.6% | 44.5% | NA |
| Gas by difference | 16% | 10.8% | 14.0% | NA |
| Aromatics in Pyrozylate(Table II) | 43.0% | 52.5% | 56.0% | NA |
| Lbs. Aromatics produced Result | .430 × .46 0.1978 lbs | 5.25 × .386 2.027 lbs | 56.0 × .415 23.24 lbs | NA |
| Lbs. Aromatics created | Unknown | Unknown | Unknown | NA |
| % Aromatics Created by wt. | Unknown | Unknown | Unknown | NA |

TABLE III-C

| | Reactor I | Reactor II | Reactor III | US Bureau Mines |
|---|---|---|---|---|
| % Aromatics by wt. | 19.78% | 20.27% | 23.24% | 12.2% |

TABLE IV

Styrene Output Styrene-Isoprene Pyrolysis
Styrene treated as a separate species

| | Reactor | | | |
|---|---|---|---|---|
| | I | II | III | IV |
| Charge into Reactor as Styrene | 0.5 lb | 5.0 lb | 50.0 lb | 500.0 lb |

TABLE IV-continued

Styrene Output Styrene-Isoprene Pyrolysis
Styrene treated as a separate species

| | Reactor | | | |
|---|---|---|---|---|
| | I | II | III | IV |
| % Styrene in Liquid Product by wt. | 54.6% | 51.0% | 60.2% | 33.2% |
| Styrene output anal % × yield % by wt. | .54.6 × .91 | .510 × .958 | .602 × .920 | .332 × .94625 |
| Result | 49.686% | 48.858% | 55.384% | 31.455% |
| Expected yield Styrene @ 100% conversion | 50% | 50% | 50% | 50% |

Reactor III shows more styrene out than in, demonstrating conversion of isoprene.
This teaches away from known art.

TABLE V

Total Output from Styrene-Isoprene Pyrolysis
Aromatics and Non-Aromatics

| | Reactor | | | |
|---|---|---|---|---|
| | I | II | III | IV |
| All aromatics in pyrozylate, including styrene % by wt. | 69.7% | 73.1% | 78.3% | 74.8% |
| Aromatic output anal % × yield % by wt. | .697 × .91 | .731 × .958 | .783 × .92 | .748 × .946 |
| Result | 63.4% | 70.0% | 72.0% | 70.8% |
| Non-aromatic output anal % × yield % by wt. | .299 × .91 | .260 × .958 | .203 × .920 | .241 × .946 |
| Result | 27.2% | 24.9% | 18.7% | 22.8% |

Maximum output of total aromatics coincides with minimum output of non-aromatics in Reactor III
This demonstrates conversion of non-aromatics into aromatics. Again, teaching away from known art.

TABLE VI

Benzene Equivalency Chart

| | Reactor | | | |
|---|---|---|---|---|
| | I | II | III | IV |
| Styrene input (lbs) | 0.5 | 5.0 | 50 | 500 |
| Benzene Molar Equivalent expectation value | .375 | 3.75 | 37.50 | 375.0 |
| Benzene Molar Equivalent actual test value | 0.47202 | 5.3512 | 53.6888 | 522.80589 |
| Increase of Aromatic Rings Bz. Eq. by wt. % | 25.872% | 42.699% | 43.170% | 39.415% |

TABLE VII

Heating/Firing Rate Data
For Styrene-Isoprene and Tires*

| | Reactor | | | |
|---|---|---|---|---|
| | I | II | III | IV |
| A Firing Rate BTU/hr | 41,000 | 41,000 | 400,000 | 400,000 |
| B Polymer Charge | 1 lb | 10 lb | 100 lb | 1000 lb |
| C Reactor Weight | 10 lb | 100 lb | 1500 lb | 1500 lb |
| D BTU/lb/hr (charge) | 41,000 | 4,100 | 4,000 | 400 |
| E BTU/lb/hr (total) | 3,727 | 372 | 250 | 160 |

D = A ÷ B
E = A ÷ (B + C)
*1000 lb tire test was not conducted

The data shown in Table III-A was obtained in the following ways:

Pyrozylate liquid and char are reported experimental values. Gas, as stated, is a mass/material balance calculated by difference. Aromatics in Pyrozylate, is the arithmetic sum of the results reported in Table I for such species. Lbs. Aromatics Produced is the said sum(s) of Table I times the yield(s) of the pyrozylate liquid, resulting in an overall yield by weight. Lbs. Aromatics Created is the result of the produced aromatics minus the amount of initial aromatic charge (to wit 50% by wt.). % Aromatics Created is simply the above results stated in/as a percent. III-B is obtained in a similar manner as III-A. However, only the analytical results are known and not the exact nature of the charge/feedstock. Hence, the reported unknowns. III-C addresses the issue of the reported unknowns. III-C is a relative comparison of the inventionis output to a similar study by the U.S. Bureau of Mines #7302. The U.S. Bureau of Mines reported an average value of 33.9 gal/ton of aromatics (see page 10, Heavy Oils). This number was converted to a percent by weight as follows:

Assume a density of 0.9 for the aromatic oil, a generous figure. Then 0.9 times 8 equals 7.2 lb/gal times 33.9 gal/ton equals 244.08 lb/ton aromatics. 244.08 divided by 2000 equals 12.2%, average aromatic yield by weight.

The facts that can be generalized from the data shown in Table III-A concerning the process of the present invention are as follows:

There are more aromatics out of than into the process, which is definitely shown for PS/PI pyrolysis. As for III-B and III-C, the results of the invention are about twice the aromatics as compared to the U.S. Bureau of Mines.

The data shown in Table IV was obtained in the following way:

Charge into Reactor as Styrene, is a reported experimental condition. % Styrene in Liquid is a reported analytical result. Analysis %×Yield % equals Result (to wit, the amount of Styrene produced). Expected yield Styrene, is as labeled, assuming 100% conversion of polystyrene into itis monomer styrene.

The facts that can be generalized from the data shown in Table IV concerning the process of the present invention are as follows:

Table IV precludes any "apples vs. oranges" arguments. By focusing only on styrene, it is made abundantly clear that more styrene comes out as monomer than went in as polymer. Again, demonstrating conversion of the only other available component, isoprene, a non-aromatic into an aromatic.

The data shown in Table V was obtained in the following ways:

All Aromatics in Pyrozylate including Styrene is obtained via Table I as the sum of all aromatic species. Aromatic Output is, as shown, the result of anal %×yield % resulting in a weight %. Non-Aromatic Output is similarly obtained using the data from Table I.

The facts that can be generalized from the data in Table V concerning the process of the present invention are as follows:

Table V does not focus on one species, as does Table IV, but rather on all aromatics and all non-aromatics produced, except non-condensible gases. Upon examination, it is apparent that the maximum output of aromatics coincides with the minimum output of non-aromatics, again, demonstrating conversion of non-aromatics (isoprene) into aromatics.

The data shown in Table VI was obtained in the following ways:

Assuming 50% (wt.) Polystyrene and 50% (wt.) Polyisoprene as the initial reactor charge, then for each aromatic ring into the system, a one to one correspondence should exist for each ring out, according to known art, i.e. 1000 lb charge implies 500 lb polystyrene charge, this further implies 500 lbs styrene divided-by 104 lbs/mole lb styrene, resulting in 4.8 mole lbs of styrene. By removing the ethenyl group from the styrene and substituting a hydrogen in its place, it is understood that the 4.8 mole lbs of styrene should produce an equivalent molar value of benzene, which is called the Benzene Molar Equivalent in Table VI. Therefore, 4.8 moles×78 lbs/mole (benzene)=375 lbs. This is the Benzene Molar Equivalent expectation value for the 1000 lb example. The rest of Table VI is organized accordingly by powers of 10. Should this expectation value be exceeded, then aromatic rings are being produced/formed at the expense of isoprene. Benzene Molar Equivalent actual test value, is as stated. It is the arithmetic result, the sum in total, for all aromatic species in each test.

The following chart is a sample/example calculation showing the operations necessary to convert toluene into its Benzene Molar Equavalent.

| Sample Calculation for Toluene molecular weight 92 PS/PI Pyrolysis | | | |
|---|---|---|---|
| | | Reactor | |
| | I (1 lb) | II (10 lb) | III (100 lb) | IV (1000 lb) |
| A Total Yield Lbs | 0.91 | 9.58 | 92.0 | 946.25 |
| B Toluene % (anal.) | .041 | .051 | .056 | .076 |
| A × B = C | 0.03731 | 0.48858 | 5.152 | 7.1915 |
| C ÷ 92 = D | $4.055 \times 10^{-4}$ | $5.310 \times 10^{-3}$ | 0.056 | 0.78168 |
| D × 78 = E | 0.316324 | 0.41423 | 4.3648 | 60.9714 |

C = lbs of toluene produced
D = moles toluene produced
E = Benzene Molar Equivalent (lbs) for toluene As previously stated these operations are carried out for each aromatic species and the sum result is reported as the Benzene Molar Equivalent actual test value. Alternatively, the sum of all E is the Benzene Molar Equivalent actual test value.

The Increase of Aromatic Rings Bz.Eq. is simply the percent increase between the expectation value and the actual test value i.e., in Reactor I.

0.47202 divided by 0.375 minus 100%=25.872% increase

The facts that can be generalized from the data in Table VI concerning the process of the present invention are as follows:

The increase in weight of aromatic species is not do, in general, to the akylation of existing aromatic rings, but rather to an increase in the number of aromatic rings. Some Akylation/Rearrangement/Disruption of the preexisting aromatic rings is surely occurring, however it is undeniable that a gross feature of the invention is that new aromatic rings are forming using isoprene as a starting material. The percent increase of aromatic rings is substantial, up to 43% by weight, which definitely exceeds the values reported in the known art. It is the large increase in the number of aromatic rings, not the akylation of existing rings, that teaches very far indeed, away from known art.

The data shown in Table VII was obtained in the following ways:

Table VII is a summation of experimental conditions, such as heat rate, reactor weight and polymer charge. The firing rates per pound are clearly explained by the table.

The facts that can be generalized from the data in Table VII concerning the process of the present invention are as follows:

It is easily understood/observed that the polymer charges and heating rates are varied by powers of ten, thereby covering a range of experimental conditions. The difference between Reactor I and Reactor II lies partly in the size of the reactor and partly in the heating rate. The previous tables demonstrated that the reactor's output is significantly changed by these variations, with respect to Reactors I and II, the heating rate is especially emphasized because the ten pound reactor is of necessity, ten times the size and weight of Reactor I. The principle difference between Reactor II and III is size. The heating rates are close to one another, but the size of Reactor III is substantially greater. The significant difference of the output between Reactors II and III is due mainly to size, which is an unexpected result related to the non-scalability of pyrolysis. The difference between Reactors III and IV shows partly that of charge size/amount (Reactor III and Reactor IV are identical) and partly that of heating rate. The greatest difference being that of charge size, which is an order of magnitude (10×), whereas the heating rate is diminished by only 90 BTU/lb/hr (total). 250−160=90.

It will be appreciated that a process for pyrolyzing hydrocarbons and particularly plastic or rubber scrap has been described in which there are an increased amount of aromatics in the output material as compared to the input materials. It should also be appreciated that a process has been described for pyrolyzing polymer feed stock which includes a large variety of polymers like rubbers, latexes, mixtures such as automobile fluff and tires and various plastics including computer casings, diskettes and circuit boards, etc., as well as paints, inks, adhesives and limited amounts of halogenated polymers which may also be included in the feed stock. Accordingly a robust process is availed so that expensive feed stock handling and pre-sorting operations may be eliminated and/or minimized.

While the present invention has been described in connection with the preferred embodiments of the various figures, it is to be understood that other similar embodiments may be used or modifications and additions may be made to the described embodiment for performing the same function of the present invention without deviating therefrom. Therefore, the present invention should not be limited to any single embodiment, but rather construed in breadth and scope in accordance with the recitation of the appended claims.

I claim:

1. An apparatus for the pyrolysis of a hydrocarbon material comprising:
    a double-walled vessel comprising:
    an upper stage comprising:
        an inclined upper inner walled vessel having an upper material input means and a lower material output means;
        an upper outer walled vessel having an upper gas output means and a lower gas input means and surrounding the upper inner walled vessel such that an upper gas conveying space is interposed between said upper inner walled vessel and said upper outer walled vessel;
    a lower stage comprising:
        an inclined lower inner walled vessel having an upper material input means connected to the lower material output means of the upper inner walled vessel and a lower material output means;
        a lower outer walled vessel having an upper gas output means connected to the lower gas input means of the upper outer walled vessel and surrounding the lower inner walled vessel such that a gas conveying space is interposed between said inclined lower inner walled vessel and said lower outer walled vessel; and
        a heater positioned in the lower stage.

2. The apparatus of claim 1 wherein a gas conveying means extends from the upper inner walled vessel to the heater and a gas conveying means extends from the lower inner walled vessel to the heater.

3. The apparatus of claim 1 wherein the upper inner walled vessel and the lower inner walled vessel are inclined in opposed directions.

4. The apparatus of claim 1 wherein the inclined upper inner walled vessel and the inclined lower inner walled vessel each comprise a means of agitation.

5. The apparatus of claim 4 wherein the means of agitation for the inclined upper inner walled vessel and the inclined lower inner walled vessel are independent to allow for varying rates of agitation.

6. The apparatus of claim 1 further comprising a heater positioned in the upper stage and wherein the upper stage and the lower stage are heated independently.

7. The apparatus of claim 1 wherein the upper inner walled vessel comprises an upper gas output line and the lower inner walled vessel comprises a lower gas output line.

8. An apparatus for the pyrolysis of a hydrocarbon material comprising:
    a reactor comprising:
    a plurality of units comprising at least a first stage unit and a second stage unit, the first stage unit comprising a first inner walled vessel and the second stage unit comprising a second inner wall vessel, wherein the first inner walled vessel comprises a material input opening and a material output opening and the second inner walled vessel comprises a material input opening and a material output opening, the material output opening of the first inner walled vessel is in physical communication with the material input opening of the second inner wall vessel;
    a heat source located at a position beneath the first inner walled vessel; and
    wherein the reactor has an outer wall and a gas conveying space between the outer wall and the first inner wall vessel and the second inner wall vessel.

9. The apparatus of claim 8 wherein the first inner walled vessel comprises a first conveyed bed of hydrocarbon material and the second inner walled vessel comprises a second conveyed bed of hydrocarbon material, and wherein the first conveyed bed is at least partially elevated relative to the second conveyed bed.

10. The apparatus of claim 8 wherein the first inner walled vessel and the second inner walled vessel each comprise an agitator.

11. The apparatus of claim 9 wherein the agitators of the first inner walled vessel and the second inner walled vessel are independent and agitate at varying rates.

12. The apparatus of claim 8 further comprising a second heat source, and wherein the heat source and the second heat source are positioned to independently heat the first inner walled vessel and the second inner walled vessel, respectively.

13. The apparatus of claim 8 wherein the first inner walled vessel comprises at least a first gas output line and the second inner walled vessel comprises at least a second gas output line.

14. The apparatus of claim 13 wherein the first gas output line and the second gas output line, respectively, each of which diverts liquid to a liquid line and gas to a loop gas line.

15. The apparatus of claim 14 wherein the loop gas line extends to the heat source.

16. The apparatus of claim 9 wherein first conveyed bed and the second conveyed bed are inclined.

17. The apparatus of claim 9 wherein first conveyed bed and the second conveyed bed are inclined in opposed directions.

18. The apparatus of claim 1, wherein the inclined upper walled vessel and the inclined lower inner walled vessel facilitate gravitational flow of the hydrocarbon material from the upper material input means to the lower material output means.

19. The apparatus of claim 1, wherein:
    the double-walled vessel comprises at an intermediate stage disposed between the upper stage and the lower stage;
    the intermediate stage is connected to at least one of the upper stage and the lower stage, and has an inclined intermediate inner walled vessel having an upper material input means and a lower material output means and an intermediate outer walled vessel having an upper gas output means and a lower gas input means; and
    the intermediate outer walled vessel surrounds the intermediate inner walled vessel such that an intermediate gas conveying space is interposed between the intermediate inner walled vessel and the intermediate outer walled vessel.

20. The apparatus of claim 1, wherein the inner walled vessel of the upper stage unit comprises an air lock adjacent the material input opening and the inner walled vessel of the lower stage unit comprises an air lock adjacent the material output opening.

21. The apparatus of claim 8, wherein the first inner walled vessel of the first stage unit comprises a bed of hydrocarbon material which is oriented to facilitate gravitational flow of the hydrocarbon material from the material input opening of the first inner walled vessel to the material output opening of the first inner walled vessel.

22. An apparatus for the pyrolysis of a hydrocarbon material comprising:
a reactor comprising:
a first stage unit and a second stage unit, the first stage unit comprising a first inner wall vessel and the second stage unit comprising a second inner wall vessel wherein the first inner wall vessel comprises a material input opening and a material output opening and the second inner wall vessel comprises a material input opening and a material output opening, the material output opening of the first inner wall vessel is in physical communication with the material input opening of the second inner wall vessel;
a heat source located at a position beneath the first inner walled vessel;
wherein the reactor has an outer wall and a gas conveying space between the outer wall and the first inner wall vessel and the second inner wall vessel;
wherein the first inner wall vessel comprises an air lock adjacent the material input opening, and the second inner wall vessel comprises an air lock adjacent the material output opening; and
wherein the first inner walled vessel of the first stage unit comprises a bed of hydrocarbon material which is oriented to facilitate gravitational flow of the hydrocarbon material from the material input opening of the first inner walled vessel to the material output opening of the first inner walled vessel.

* * * * *